United States Patent
Ellison et al.

(10) Patent No.: US 6,542,690 B1
(45) Date of Patent: Apr. 1, 2003

(54) CHALCOGENIDE DOPING OF OXIDE GLASSES

(75) Inventors: Adam J. G. Ellison, Corning, NY (US); Rostislav R. Khrapko, Moscow (RU)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/566,542

(22) Filed: May 8, 2000

(51) Int. Cl.[7] .................................. G02B 6/00
(52) U.S. Cl. ........................................ 385/141
(58) Field of Search ........................ 385/130–141, 385/147

(56) References Cited

U.S. PATENT DOCUMENTS

| | | | | |
|---|---|---|---|---|
| 4,263,030 A | * | 4/1981 | Kobayashi et al. | 65/30.1 |
| 4,969,941 A | | 11/1990 | Kyoto et al. | 65/18.1 |
| 5,367,588 A | * | 11/1994 | Hill et al. | 264/2.6 |
| 5,392,376 A | * | 2/1995 | Aitken et al. | 385/142 |
| 5,735,927 A | * | 4/1998 | Sanghera et al. | 65/36 |
| 5,879,426 A | * | 3/1999 | Sanghera et al. | 65/405 |
| 5,973,824 A | * | 10/1999 | Sanghera | 359/134 |

FOREIGN PATENT DOCUMENTS

| | | |
|---|---|---|
| EP | 0 968 972 A1 | 1/2000 |
| JP | 55-144437 | 11/1980 |

* cited by examiner

Primary Examiner—Akm E. Ullah
(74) Attorney, Agent, or Firm—Robert L. Carlson

(57) ABSTRACT

The present invention relates to a glass article for use as an optical waveguide fiber and more particularly to an optical waveguide fiber, the core of which is doped with a chalcogenide element to significantly increase the refractive index of the core. The subject of this invention is novel doped silica core compositions wherein a portion of the oxygen in the silica is replaced with either sulfur, selenium or tellurium using plasma enhanced chemical vapor deposition (PECVD). These compositions are designed to have higher refractive indices than silica, low coefficients of expansion, high optical transparency, and appropriate viscosity and softening points to make them ideal candidates for use as optical waveguide fibers.

17 Claims, 2 Drawing Sheets

CHALCOGENIDE DOPING OF OXIDE GLASSES

BACKGROUND OF THE INVENTION

1. Field of the Invention

The present invention relates to a glass article for use as an optical waveguide fiber and more particularly to an optical waveguide fiber, the core of which is doped with a chalcogenide element (i.e., sulfur, selenium) to increase the refractive index of the core.

2. Prior Art

Optical waveguides are low loss filaments which have been recently developed as the transmission medium for high capacity optical communication systems. To efficiently achieve this result, it is required that optical waveguides possess non-zero numerical aperture (NA) values as defined by the equation: $NA = (RI^2_{core} - RI^2_{clad})^{1/2}$, where $RI_{core}$ is the refractive index of the core and $RI_{clad}$ is the refractive index of the clad at the wavelength of interest. In order to obtain such values, the equation requires that the refractive index (RI) of the core of the filament be greater than the RI of the cladding layer of the filament.

Furthermore, optical waveguides are often grouped into cables or bundles to provide capacity; each individual fiber typically being tied into its own light source. It is also possible to bundle the fibers to provide redundancy in case of fiber breakage and to transmit a greater amount of the light generated by a source.

Silica is the most important oxide material in telecommunications and optical applications, in part because it can be obtained in exceptionally high purity via chemical vapor deposition methods. Prior art methods have in common the combustion of precursor halides or organometallic compounds in a fuel-air or fuel-oxygen flame. The fine soot that results is laid down on a substrate and consolidated into a bulk glass. Other components may be added with silicon, provided that their vapor pressures are high enough to be delivered to the burner. Well known examples include phosphorous, boron, germanium, and titanium. In each case the metal is combined with oxygen, obtained in the flame from the oxidizer and from the ambient atmosphere. Limited amounts of fluorine can be added as well, usually by flowing fluorine over the soot during the consolidation. However, addition of anions other than fluorine is extremely difficult.

Metal oxides are added to silica to obtain new optical properties. Titanium and germanium are added, for example, to increase the refractive index and/or to obtain a photorefractive effect for writing gratings. Aluminum is added to germanosilicate-based 1.5 micrometer erbium doped amplifier glasses to obtain broader, flatter gain spectra.

As is well known to practitioners in the technology of optical waveguide fibers for telecommunications, the refractive index of the core material must be higher than that of the cladding material in order to support transmission of an optical signal. As noted supra, this is typically performed by doping with such materials as titanium and germanium. These and other materials are known to raise the refractive index values of silica glass, but these materials have been detrimental to other properties, extremely difficult to incorporate, or expensive for applications such as telecommunication transmissions, especially with regard to unwanted absorption or intrinsic scattering of signals. Due to the severe limitations of useful metallic dopants and methods of incorporating anionic species, advancement in the art of telecommunication via waveguide fiber optics has been hampered.

High quality optical waveguides must meet many stringent requirements before they can have commercial viability. Some of these physical requirements may include minimal loss of propagated light signal, high physical strength, and low coefficient of expansion. The process of manufacturing optical waveguides place additional constraints on the types of materials that can be utilized. Such constraints may include tight viscosity range, minimal volatility of dopants, maintenance circularity during rod preform and redrawing operations, similar coefficients of expansion of the core and the cladding, core softening point temperature below or near to the cladding softening point temperature, and high tensile strength during redrawing.

Additionally, depending on the desire to have single mode or multi-mode waveguides, the numerical aperture (NA) must have specific values for a particular core radius. The NA value is derived from an equation that relates refractive indices of the core and the cladding materials, so constraints on NA values cause constraints on materials that can be selected for the core or the cladding compositions.

The stringent optical requirements placed on the transmission medium to be employed in optical communication systems has negated the use of glasses obtained from melted precursors, since attenuation therein due to both scattering and impurity absorption tends to be too high. Thus, unique methods had to be developed for preparing very high purity glasses in filamentary form.

Ideally, the consolidated optical fiber preform should have uniform characteristics along its length. In practice, however, it has been found that the consolidation process results in "axial trends" along the length of the consolidated preform such that fiber produced from the tip of the preform has different properties from properties of fiber produced from the middle of the preform. Similarly, fiber produced from the middle has different properties from properties of fiber produced from the handle end. Metallic dopants such as germanium exacerbate this problem. Therefore, alternative dopants would be desirable.

As can be seen from the number of design and process limitations, compositions for an optical waveguide are severely restricted. There is a strong desire to identify and utilize novel compositions and novel manufacturing processes.

SUMMARY OF THE INVENTION

One aspect relates to an optical waveguide containing at least 0.01 mol, more preferably at least 0.05 mol percent and most preferably at least 0.1 mol percent of a chalcogenide such as sulfur. The waveguide preferably also consists primarily of silica, for example in an amount greater than 85 mol percent. In a preferred embodiment, the optical waveguide is an optical fiber comprising a core and a cladding region, the refractive index of said core and clad being configured with respect to one another so that the core is capable of guiding light.

Prefered chalcogenide elements to be incorporated into the silicate glass include sulfur and selenium, the most preferred being sulfur. In the most preferred embodiment, the waveguide or fiber contains at least 0.05, and more preferably more than 0.1 mol percent sulfur.

The fiber or other waveguide may also contain an element selected from the group consisting of phosphorous, aluminum, and boron and mixtures thereof, either to alter the refractive index of the material or the optical characteristics of the material. Likewise, the waveguide may additionally contain metal ions selected from the group consisting of germanium, titanium, zirconium, lanthanum, arsenic, and antimony and mixtures thereof.

The optical waveguide may additionally include lanthanide metals to produce optical activity (e.g. for amplifier or laser glass).

Another aspect of the present invention relates to a method of making an optical waveguide preform containing sulfur therein. In the method, a plasma is ignited inside a substrate tube (for example, as in plasma enhanced chemical vapor deposition) in the presence of a chalcogenide containing precursor compound and a silica forming precursor compound, under conditions which are effective to deposit and thereby depositing a glassy deposit comprised of silica doped with said chalcogenide material on the inside of said tube.

During said depositing step, the tube is preferably heated to a temperature of greater than about 1100° C. The depositing step preferably also takes place in the presence of an amount of oxygen which is approximately equal to or less than the amount of oxygen needed to convert the amount of silicon atoms present to a stoichiometric silica glassy deposit. In this way, an amount other aspect of the present invention relates to novel doped silica core compositions wherein a portion of the oxygen in the silica is replaced with either sulfur, selenium or tellurium using plasma enhanced chemical vapor deposition (PECVD). These compositions have higher refractive indices than silica, low coefficients of expansion, high optical transparency, and appropriate viscosity and softening points to make them ideal candidates for use as optical waveguides.

Deposition of one material onto a second material has been one approach to creating a core-clad glass optical waveguide. Traditionally, this is performed using conventional vapor deposition techniques such as Inside Vapor Deposition (IVD) and Outside Vapor Deposition (IVD). However, these conventional techniques utilized a flame hydrolysis process that typically caused unwanted decomposition of reactant materials leading to byproducts or physical defects in the nascent glass article. We have discovered that plasma enhanced chemical vapor deposition (PECVD) eliminates these problems and allows incorporation of previously unavailable materials, in particular chalcogen elements.

Plasma laydown differs from conventional IVD or OVD approaches in that reactants (metal ions and anions) are combined together from separate sources in a plasma, rather than in a flame. In addition, the materials go directly from the plasma to fully dense glass, thereby controlling off-gas of erstwhile volatile components during the consolidation (firing) step. This capability allows the possibility of replacing the oxygen with other anions in order to create either new compositions or oxygen deficient pure silica.

The present invention results in a number of advantages over prior art methods. For example, the compositions and methods disclosed herein provide an alternative to optical fibers composed of germanium-doped silica core glass for use in telecommunication technology.

Using the methods disclosed herein, a silicate core glass can be formed which has higher refractive index than silica, wherein the increased refractive index is obtained via a nonmetallic dopant, such as sulfur, selenium or tellurium. The most preferred of such dopants is sulfur.

Such methods and the resultant compositions are expected to be useful in making optical fiber for optical gratings and optical amplifiers.

A photosensitive fiber light guide, whose core, according to the invention, is doped with sulfur, enjoys the following additional advantages in comparison with the prior art. The low concentration of dopant ensures low optical losses in the infrared range. Waveguide properties of the fiber light guide made according to the invention are close to the properties of a standard light guide, thereby facilitating their connection. Moreover, the claimed light guide, as shown by experiments, possesses high photosensitivity at a wavelength of 193 nm without additional hydrogen treatment, which complicates the process of recording photoinduced structures and causes a deterioration in their temperature stability. A fairly large induced change in refractive index ($\Delta n > 1 \times 10^{-3}$) is achieved at relatively low dose ($D < 1$ $kJ/cm^2$) and energy density (1–100 $mJ/cm^2$) of ultraviolet radiation. The process of change in refractive index is initiated by one-photon absorption at the indicated wavelength, for which reason the requirements on spatial uniformity of the beam of exciting laser radiation during recording of the photoinduced structure is not as high as in the case of a process based on two-photon absorption.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Reference will now be made in detail to the present preferred embodiment(s) of the invention, (an) example(s) of which (is/are) illustrated in the accompanying drawings. Wherever possible, the same reference numbers will be used throughout the drawings to refer to the same or like parts.

Figure 1:
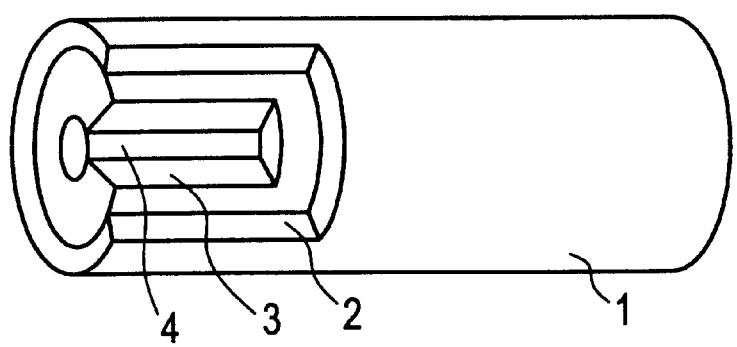
FIG. 1 illustrates an optical fiber.

FIG. 1 depicts the design of an optical fiber light guide 1, containing a protective polymer coating 2, cladding 3, and a core 4.

In the manufacture of optical waveguides, the materials of the core and cladding of the waveguide are preferably produced from a glass having minimum light attenuation characteristics. Silica (i.e., silicon dioxide) doped with index-raising or index-lowering elements is a particularly suitable glass.

Since the core glass must have a higher index of refraction than that of the cladding, for proper operation, the core glass may be formed of the same type of glass used for the cladding and doped with a small amount of some other material to slightly increase the refractive index thereof. For example, if pure silica is used as the cladding glass, the core glass can consist of silica doped with a material to increase its refractive index. Alternatively the cladding may be doped to lower the refractive index with respect to the core. One underlying difficulty with conventional designs is that relatively high levels of metal dopant are required to significantly modify the refractive index of a silicate glass, yet other properties of the glass are also affected. It can therefore be difficult to match the properties between the core and the cladding.

As aforementioned, in one aspect of the invention, at least a portion of the oxygen in silica is replaced with other anions that will increase the refractive index of the resultant material. Specifically, the present invention utilizes chalcogenide elements instead of the more conventional dopants, such as germanium. It is believed that the invention involves partial substitution of the oxygen in silicon dioxide with the chalcogenides. Chalcogenide elements, as used herein, are hereby defined as the Group VI elements comprising sulfur, selenium, tellurium, and polonium. Doping silicon dioxide with chalcogenide ions requires significantly less quantity to affect the refractive index than conventional dopants such as germanium; therefore, their effect on other properties will be minimized. Of the chalcogenides, substitution of oxygen with sulfur and selenium is preferred and substitution with sulfur is most preferred. Since oxygen and the chalcogenide elements are all from Group VIB of the Periodic Chart, they can have the same valency. Therefore, when substitution of oxygen with a chalcogenide element is made the replacement is essentially one for one on an atomic basis. The chalcogenide element be 0.05–3 wt % (about 0.1 to 6 mol %) of the anionic content (i.e., up to 6 wt % (about 12 mol %) of the oxygen is replaced by a chalconide element). At 1 wt % (about 2 mol %) replacement of oxygen by sulfur, the Y value will be 0.04; while for a 1 wt % (about 2%) replacement of oxygen by tellurium, the Y value will be 0.15. Replacement of oxygen can be obtained with either one or multiple chalcogen elements.

Replacement with sulfur, selenium, or tellurium theoretically affects three properties of the silica material. Firstly, the refractive index will increase. In general, the refractive index of a glass increases as small, nonpolarizable ions (e.g., Si) are replaced by larger, more polarizable ions (e.g., Ge). However, the polarizabilities of anions tend to be greater than those of cations because most of the valence electron density resides on or near the anions. Based on various pairs of oxide and related chalconide analogs, it appears that, where sulfide and oxide analogs of a glass exist, the sulfide glass has a much higher refractive index: e.g., refractive indices of $GeO_2$ and $GeS_{2.01}$ are 1.6 and 2.2, respectively. This is due to the higher polarizability of sulfur compared to oxygen. Therefore, replacement of oxygen by sulfur results in a suitable core material for long-haul or other types of telecommunications fiber.

Another important property of the chalcogenide doped silica is an enhanced photorefractive effect in which changes in refractive index are induced by exposure to sub-band gap light (for example, from a 193 nm ArF excimer laser). This effect is all but absent in the conventional $SiO_2$ obtained by chemical vapor deposition processes. Pure sulfide glasses have absorption edges that lie far to the red of the absorption edges of the oxide analogs. For example, while $GeO_2$ is colorless in white light, $GeS_{(2+x)}$ (x is approximately 0.01–0.03) is straw yellow. Not wishing to be held by theory, the origin of the edge shift is unclear, but is thought to arise from a defect mechanism wherein a small number of S—S and M—M type bonds (M is the cation) are present together with conventional M—S bonds. Such bonding configurations are thought to be responsible for the extremely weak photorefractive effect in $SiO_2$ and the somewhat larger effect observed in germania-doped silica. The defects in question are thought to be present in extremely low concentrations. This property allows the sulfur doped silica materials to be useful for writing Bragg gratings and waveguides into sulfur-doped silica fiber and planar fiber optic face plate devices.

A third important property of chalcogenide doped silica leading to a novel utility is the creation of novel environments for optically active dopants. These dopants include lanthanide series metal ions comprising cerium, praseodymium, neodymium, promethium, samarium, europium, gadolinium, terbium, dysprosium, holmium, erbium, thulium, ytterbium, and lutetium, as well as optically active nanophase materials such as sulfides or selenides of zinc, cadmium, and lead. When incorporated into the core of an optical waveguide, doping levels with these metal ions up to 10,000 ppm can be achieved into the glass without undue deficiencies. Preferred concentrations range between 100 and 5000 ppm and most preferred concentrations are between 100 and 2000 ppm together with S in an amount which is preferably greater than 0.01 mol percent, more preferably greater than about 0.2 mol percent. The metal ions preferably are distributed uniformly throughout the core.

As mentioned supra, plasma enhanced vapor deposition (PECVD) allows for milder thermal conditions by utilizing a rf-induced glow discharge under low pressure to transfer energy to the reactant gases, allowing the substrate to remain at a lower temperature than the conventional processes. For a discussion of PECVD, see, for example, D. Pavy, M. Moisan, S. Saada, P. Chollet, P. Leprince, J. Marec: "Fabrication of optical fiber preforms by a new surface-plasma CVD process," ECOC '86, pp. 19–22, 1986, the specification of which is hereby incorporated by reference. Applicants have been able to realize doping of silica with chalcogenides using PECVD. Utilizing the PECVD process, vapor deposition of a silica is achieved by combusting a non-oxide precursor such as octamethylcyclotetrasilane or silicon tetrachloride in an oxygen-rich flame. Doping with sulfur is obtained using sulfur dioxide in the presence of silicon tetrachloride and, optionally, oxygen. Doping with selenium or tellurium can be achieved using selenium dioxide or tellurium dioxide, respectively. Optional doping of silica with germanium, boron, phosphorous can be accomplished in similar fashion by using a wide range of volatile dopant precursors such as chlorides or oxides.

Doping silica with sulfur using PECVD at temperatures about 1200° C. yields a solid and transparent glass. When the concentration of oxygen is decreased, the amount of sulfur incorporation can be up to 1 weight %. No soot is formed in this process and no sintering step is required.

In one method in accordance with the invention for forming a preform suitable for making an optical waveguide, a pure silica substrate tube is provided, and silica doped with sulfur is deposited by PECVD on the inner surface of the substrate tube to form the core region of the nascent preform. In one embodiment, a plasma discharge of reduced pressure was used. A reference quartz tube 20 mm in diameter with a wall thickness of 2 mm was heated to a temperature of 1300° C. A mixture with the composition $SiCl_4+SO_2$ at a full pressure of 1 mm Hg was supplied to the reference tube. The SHF power was varied in the range 1–5 kW. The amount of sulfur dioxide entering the reactor per unit time was $2.5 \times 10^{-3}$ mol/min.

Using the resultant preform, a photosensitive fiber light guide of standard dimensions was made, containing 0.4 wt % (about 0.8 mol %) sulfur. The substrate tube and the doped deposited silica are then preferably subjected to heat raising the temperature up to approximately 2000° C. in order to collapse the tubular structure into a cylindrical glass preform. The radial thickness of the core is determined by chemical and physical measurements to be approximately 1 mm. The preform can optionally be fabricated into an optical waveguide fiber or a planar waveguide.

Figure 2:
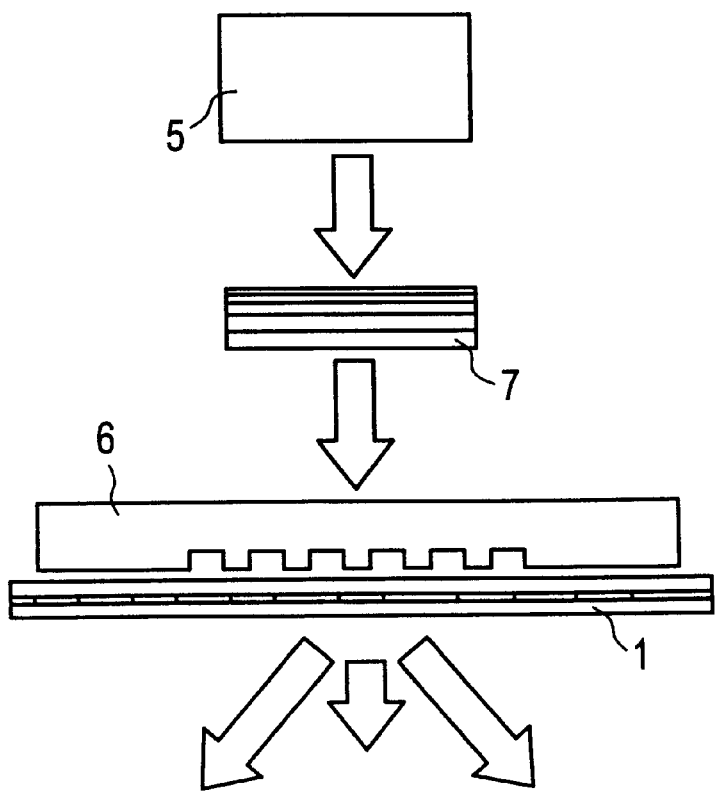
FIG. 2 depicts a block diagram of an apparatus for modulating refractive index of the fiber of the present invention using laser ultraviolet radiation.

In one embodiment, the fiber of the present invention may be selectively exposed to radiation sufficient to alter the refractive index of the fiber along its length, thereby forming a grating. For example, using the fiber mentioned above which had 0.4 weight percent sulfur within its core, a grating was produced in the following manner. FIG. 2 depicts a block diagram of the apparatus for modulation of refractive index with laser ultraviolet radiation. The apparatus for recording the photoinduced structure contains an ultraviolet excimer ArF laser 5, whose radiation impinges on photo mask 6, in which additional focusing of the radiation to increase its density on the surface of mask 6 can be accomplished with a cylindrical lens 7. The photosensitive fiber light guide 1 is positioned behind mask 6 in the region of interference of the beams of +1 and −1 orders of diffraction. The recording time as a function of the required parameters of the photoinduced structure can be varied in the range from a few seconds to a few minutes.

Figure 3:
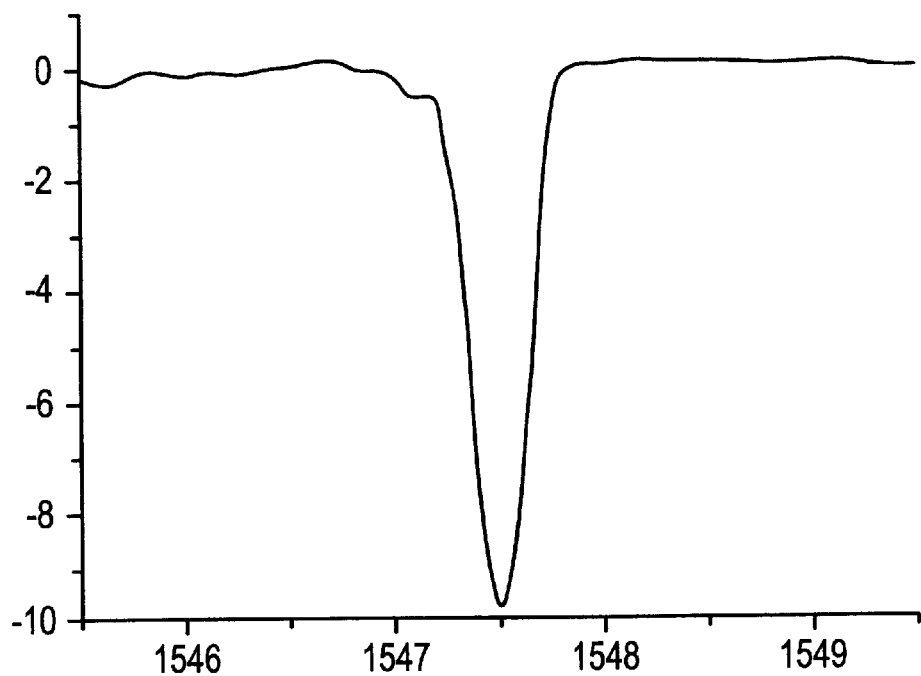
FIG. 3 illustrates the transmission spectra of a Bragg grating made using the fiber of the present invention.

FIG. 3 depicts a characteristic resultant transmission spectrum of a Bragg grating, created using the fiber of the present invention, with a period of 535 nm and a length of 3 mm. Recording of the grating was carried out at an energy density of 100 mJ/cm$^2$, a pulse repetition frequency of the laser radiation of 10 Hz and an exposure time of 15 min.

Figure 4:
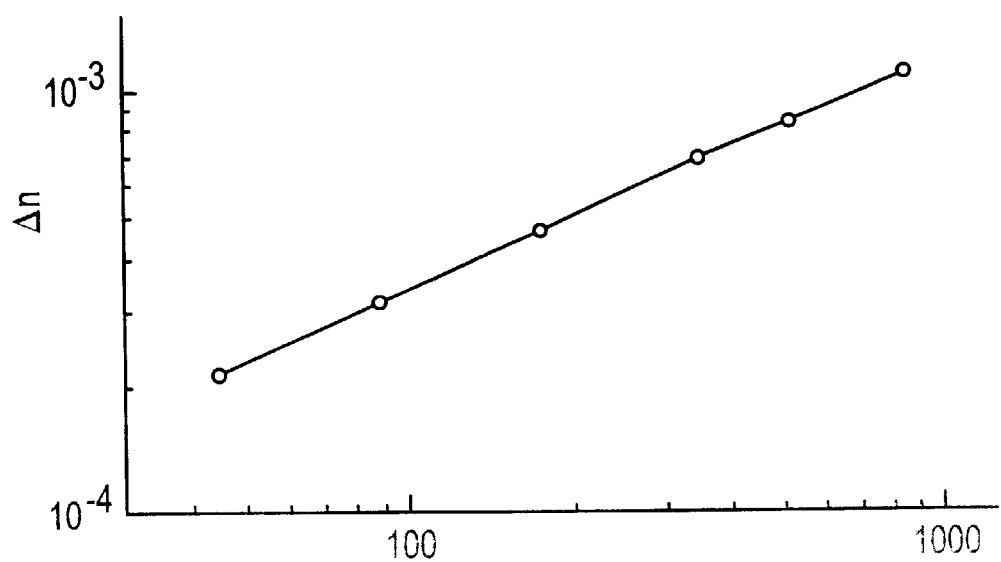
FIG. 4 illustrates induced refractive index as a function of radiation dose of an excimer ArF laser on a fiber made in accordance with the invention.

FIG. 4 depicts the induced refractive index as a function of radiation dose of an excimer ArF laser. This relation was obtained by analyzing the transmission spectrum of the grating (FIG. 3). Under the influence of radiation from an excimer ArF laser with a wavelength of 193 nm and an energy density in the pulse of 10 mJ/cm$^2$, a stable induced refractive index $\Delta n \sim 1 \times 10^{-3}$ was created, where $\Delta n = (n_0^2 - n_c^2)/2 n_c^2$. Exposure conditions: duration of exposure 15 min, pulse length 20 nsec, pulse frequency f=10 Hz, radiation dose D=1 kJ/cm$^2$. A Bragg grating was recorded in this light guide, using a phase mask with a period of 1070 $\mu$m and a suppressed zero order according to the method of (K. O. Hill, B. Malo, F. Bilodeau, D. C. Johnson, J. Albert, "Bragg grating fabricated in monomode photosensitive optical fiber by UV exposure through a phase mask," Appl. Phys. Lett., Vol. 62, No. 10, pp. 1035–1037, 1993). The experimentally measured transmission spectrum of the grating 3 mm long (FIG. 3) confirms that the induced refractive index is $1 \times 10^{-3}$. Its value can be varied by varying the radiation dose (FIG. 4).

It is also within the scope of the invention that the outer cladding layer of the optical waveguide, which consists at least in part of the precursor substrate tube, may be either pure silica either silica or silicon dioxide or can contain other oxides such as phosphorous oxide, boron oxide and aluminum oxide. These are permitted with the proviso that the refractive index of the cladding layer remains smaller than the refractive index of core material. This is achieved by providing a substrate glass tube of the appropriate composition. It is also within the scope of this invention to incorporate into the cladding layer composition conventional dopants of the type used within the glass-making industry such as fluorine, titania, phosphorus, and so forth. As noted above, the only limitation on such doping is that the refractive index of the resultant doped cladding layer must be smaller than that of the refractive index of the core.

This invention further allows the core to contain oxide components in addition to silica dioxide. These include germanium oxide, phosphorous pentoxide, boron oxide, or aluminum oxide and mixtures thereof.

Within the scope of the invention is the ability to further dope the chalcogenide-replaced silica glass with known refractive index modifiers such as multivalent metal oxides or halides. Examples of such modifiers include, but are not limited to, germanium, phosphorous, antimony, titanium, zirconium, lanthanum, arsenic, and lanthanides. Halides most useful in this invention include fluoride or chloride but other halides can be used under appropriate conditions. Due to use of halogenated raw materials, halogens can also be incorporated into the inventive chalcogenide-doped silicate glass. Within the scope of the invention, up to approximately 5 wt % (about 10 mol %) of the glass can be comprised of halogen. The most preferred halogen for incorporation is chloride.

Silica has excellent light transmission qualities (absorption and intrinsic scattering of light thereby is exceptionally low). The addition of an excessive amount of the aforementioned multivalent metal oxide dopant material in order to achieve the required RI target, however, causes absorption of light energy and intrinsic scattering of light to increase to undesirable levels. On the other hand, metal oxide dopants are one of the more expensive raw ingredients used in the preparation of optical waveguide fibers, it is important that the dopant be used in minimal quantities and that they be effectively incorporated in the preform with minimum waste.

Also within the scope of the present invention is the consideration that the chalcogenide-doped core can additionally be doped with lanthanide series metals and optically active ions selected from various Group IB, IIB, IIA and B, IVA and B, VB, VIB and VIIB metal ions. Preferred dopants include cerium, praseodymium, neodymium, promethium, samarium, europium, gadolinium, terbium, dysprosium, holmium, erbium, thulium, ytterbium, and lutetium, as well as optically active ions such as zinc, cadmium, lead, and titanium (III). Amounts up to 0.5 wt % (about 1.0 mol %) will not cause deficiencies to the inventive materials. Typically, concentrations of up to 4000 ppm can be added to the core to provide beneficial effects without detrimental consequences. Other anionic components can also be incorporated into the glass core or cladding. Typically, fluoride, boron, phosphorous, and germanium may be utilized without detriment to the inventive glass design.

As discussed supra, the use of these materials as optical waveguides in telecommunications require that the core of the fiber have a higher refractive index (RI) than that of the surrounding cladding layer. In the inventive optical waveguide glass designs, refractive index differences between the core and the cladding layer can be in the range of approximately 0.3% to about 2% (absolute differences of 0.005 to 0.025). The core doped with a chalcogenide can have a refractive index in the range of about 1.45 to 1.49 as measured at the sodium-D line wavelength.

When the inventive preform is drawn into a glass fiber, typical preferred radii values for the core range from 1.5 to about 35 microns, and more preferably from about 2 to about 30 microns. In the inventive glass fiber designs radii values for the cladding typically range from 30 to about 150 microns, preferred radii values ranging from about 40 to about 62.5 microns.

Depending on the type of fiber and its desired performance characteristics for the specified applications, the radial distribution of the index of refraction across the face of the fiber can be simple or complex. For example, single mode fibers typically have an index of refraction profile which is a simple step, i.e., a substantially uniform refractive index within the core and a sharp decrease in refractive index at the core-cladding interface. On the other hand, to produce a high bandwidth multimode fiber requires achieving a nearly parabolic radial refractive index profile in the fiber core so as to minimize intermodal dispersion. See R. Olshansky, "Propagation in Glass Optical Waveguides", Reviews of Modern Physics, Vol. 51, No. 2, April, 1979, pp 341–367.

In one embodiment of the invention, the refractive index differential between the core and the cladding need not be a step function decrease from a high value to a lower value, but may also take the form of a graded change along the radial direction, as long as the central core value is greater than that of the most distant radial outer cladding. In the case of core gradient refractive index optical waveguides, the cladding may be the outer portion of the core, or it may be a layer whose refractive index is lower than that of the adjacent core material by such an amount that there is an abrupt change in refractive index at the core-cladding interface.

In another embodiment of the invention, areas within the core can include a band of higher refractive index glass adjacent to a section with smaller radius having a lower refractive index, with the proviso that this higher refractive index band is below the value of the central core and the core has a higher refractive index than that of the cladding exterior.

In one preferred embodiment, the core refractive index is graded from core center to the edge of the core; the cladding layer has a fixed refractive index of lower value than that of the core edge.

In another preferred embodiment, the core refractive index is relatively constant and the cladding layer refractive index is also constant, but lower than that of the core.

In another embodiment of the invention, the cladding layer may be a layer in which the refractive index continuously changes in a decreasing manner, indeed, the cladding may contain a region having a refractive index that is higher than that of the next adjacent layer of smaller radius but lower refractive than that of the core.

The concentration of oxygen present in the plasma reactant stream affects the level of chalcogenide that is incorporated within the deposited doped silica layer. When oxygen is present at high levels during the plasma enhanced vapor deposition of the chalcogenide-doped silica layer, lower levels of chalcogenides are incorporated. The highest levels of chalcogenide incorporation are found when oxygen is absent from the reactant stream. Thus, in the later formed core, the level of sulfur dopant in the core of the preform decreases as the amount of oxygen increases. In the case where oxygen is absent, up to 0.5 weight percent sulfur is observed at 0.4 mm from the center of the rod preform, compared to 0.05 weight percent where oxygen is present in the plasma reactant stream at a flow rate of 0.015 slm. It is theorized that the oxygen reacts with the deposited sulfur to produce oxidized species that are volatalized during the deposition process. Oxygen appears to have no impact on the deposition profile for chlorine, which is present as a dopant as a byproduct from the tetrachlorosilane reactant. The presence of chlorine serves a valuable function by reacting with trace water or hydroxide ions, preventing them from degrading optical clarity.

After plasma enhanced chemical vapor deposition of the core material is completed, the tubular structure is preferably heated to about 2000° C. and collapsed to produce a solid rod (i.e., preform). The solid rod core thickness can be, for example, approximately 3 mm. To ultimately generate high quality fibers, the core glass softening point temperature is preferably about 50° C. lower than that of the cladding glass, so that the core glass more readily flows and closes the hole during the consolidation step and the later fiber forming process.

When collapsing the tube, it is important to maintain its circularity, since any departure therefrom affects the circularity of the final drawn fiber and, hence, adversely affects its optical transmission properties. To maintain the circularity of the collapsing tube, a small excess pressure is typically maintained within the tube as it is collapsed. The magnitude of this pressure is a function of the diameter of the central hole. In addition to maintaining circularity after the central bore is closed, a cooling zone is passed along the collapsed tube immediately behind the heating zone.

The tube can conveniently be pressurized by venting a gas flow to air or oxygen through a restricted orifice. The gas flow can comprise the original reactants, namely oxygen carrying silicon tetrachloride, sulfur dioxide and other optional component vapors. For example, a flow high in phosphorus oxychloride prevents loss of the more volatile phosphorus pentoxide. One end of the tube is connected to the input side of the orifice and the other end is sealed. This method has the advantage that the internal pressure does not change significantly when the gas in the tube is heated and it expands. The heating zone is traversed along the tube at an appropriate rate from the sealed end. The cooling zone comprises an array of nozzles positioned immediately behind the gas burner and fed with air under pressure to direct an air blast on to the heated, collapsed tube. Control of the air blast gives some control over the collapse of the tube. The blast can be conveniently adjusted to make the point of collapse occur very close to the chill air blast region. In this way, the effect of internal pressurization can be obtained until the last possible moment, when the central hole disappears and the glass is immediately chilled while it still has a substantially perfect circular form. The heating and cooling zones may be traversed along the tube several times to collapse it in stages.

An alternative method of collapsing the tube is to pass it through a heated die. The size of the die may be such that the bore of the tube is completely closed to form a rod, or may be chosen to leave a small hole in the center of the tube. The hole is eliminated during the fiber pulling operation. Another method of collapsing the tube is to pass a hot zone along the tube and rotate it while applying a graphite tool against its side, moving the tool slowly along the tube behind the hot zone.

The collapsed tube, formed by any of the methods described, is known in the art as a preform. The preform can be either a glass or soot precursor to a waveguide, e.g. a fiber. After the preform has been formed from the collapsed tube, it can then drawn down into a fiber in a fiber drawing machine. For example, a 50 cm length preform rod obtained from a tube of corresponding length can be drawn out to form a 1.2 km length of fiber.

Optical waveguides for telecommunications purposes are generally useful at wavelengths between about 900 and 1750 nm and preferably between 1250 and 1750 nm. To be commercially acceptable, such fibers generally exhibit an attenuation less than 100 dB/km, more preferably less than 50 dB/km, and most preferably less than about 25 dB/km at the operating wavelengths which preferably include 1250 to 1700 nm, and more preferably include 1400 to 1650 nm. Since fibers having an attenuation less than 25 db/km between 1250 and 1750 nm have been produced in accordance with the present invention, they are useful as the light propagating medium in optical communication systems.

Optical waveguide fibers can perform either single or multiple transmissions depending on various design parameters. In the present invention single mode transmission is obtained when the diameter of at least one fiber core is 3–8 micron and the diameter of the optical waveguide fiber is 80–125 micron. Multimodal transmission is obtained when the diameter of said fiber core is 3–70 micron and the diameter of optical waveguide fiber is 80–125 micron.

EXAMPLES

The invention will be further illustrated by the following examples which are intended to be exemplary of the invention.

The core composition of the present invention is deposited onto the inner surface of a glass tube by the process of plasma enhanced chemical vapor deposition. As is known in the art this deposition technique uses an rf-induced glow discharge to transfer energy into the reactant gases. Typical process parameters for the PECVD of chalcogenide glass have the microwave energy provided by a 2.45 GHz generator with a maximum power of 5 kW. Total gas pressure during depositions is about 0.5 torr. Source materials ($SiCl_4$, $SO_2$, $CS_2$) are evaporated from the liquids at room temperature and supplied to the reactor in the vapour form through mass flow controllers. Substrate tube temperature is monitored by an IR pyrometer. In each of the examples, a first few passes (starting deposition) were made to deposit undoped silica to provide a clean interface for deposition of sulfur doped silica, after which the doped silica was deposited (core deposition).

Example 1

The substrate was a Heraeus WG silica tube, 18×2 (OD×ID) mm

A. Starting deposition:
$O_2$ flowrate=0.15 slm
$SiCl_4$ flowrate=0.034 slm
Temperature≈1230° C.
Transient time=10 minutes B. Core deposition:
$O_2$ flowrate=0 slm
$SO_2$ flowrate: 0.032 slm
$SiCl_4$ flowrate=0.034 slm
Temperature≈1260° C.
Core deposition time=37 minutes The resultant silica glass was doped with an average amount of about 0.3 wt % (0.6 mol %) sulfur, with a peak amount of about 0.45 wt % (0.9 mol %) near the centerline.

Example 2

Core Glass Deposition
Heraeus F300 silica tube, 20×2 (OD×ID) mm

A. Starting deposition:
$O_2$ flowrate=0.15 slm
$SiCl_4$ flowrate=0.034 slm
Temperature≈1230° C.
Transient time=20 minutes B. Core deposition:
$O_2$ flowrate=0 slm
$SO_2$ flowrate: 0.036 slm
$CS_2$ flowrate=0.009
$SiCl_4$ flowrate=0.034 slm
Temperature≈1270° C.
Core deposition time=42 minutes The resultant silica glass was doped with an average amount of about 0.55 wt % (1.1 mol %) sulfur, with a peak amount of about 0.7 wt % (1.4 mol %) near the centerline.

Example 3

(Core Glass Deposition)
Heraeus F300 tube, 20×2 (OD×ID) mm

A. Starting deposition: same as Example 2
Transient time=15 minutes

B. Core deposition:
$O_2$ flowrate=0 slm
$SO_2$ flowrate: 0.024 slm
$SiC_4$ flowrate=0.034 slm
Temperature≈1270° C.
Core deposition time=48 minutes The resultant deposited silica glass was doped with an average amount of about 0.45 wt % (0.9 mol %) sulfur, with a peak amount of about 0.65 wt % (1.3 mol %) near the centerline.

Example 4

(Core Glass Deposition)
The following conditions lead to the formation of red glass in the whole cross-section of the core:
$O_2$ flowrate=0–0.015 slm
$SO_2$ flowrate=0.1–0.06 slm
$SiCl_4$ flowrate=0.034 slm Typical temperature oscillations are of +/−20° C. at the center of the substrate tube, where it is measured. Plasma column front is scanned along the substrate tube at about 2 cm/second.

Example 5

(Fiber Formation)
Collapse is performed on a special lathe with a half-circle oxygen-propane burner. During collapsing a slight overpressure of dry oxygen gas is maintained inside the tube.

A preform containing a sulfur-doped core obtained via plasma enhanced chemical vapor deposition (PECVD) made in accordance with Example 3 above was drawn into a fiber. The resultant core radius was approximately 9 mm. The index. contrast between core and clad in the preform was approximately 0.07%, which was achieved by the presence of approximately 0.6 wt % (about 1.2 mol %) sulfur within the core.

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

What is claimed is:

1. An optical waveguide containing at least 85 mol percent silica and at least 0.01 mol percent of a chalcogenide element selected from the group consisting of sulfur, selenium, tellurium, and polonium.

2. The optical waveguide of claim 1, wherein said waveguide is an optical fiber comprising a core and a cladding region, the refractive index of said core and clad being configured with respect to one another so that the core is capable of guiding light.

3. The chalcogenide-incorporated silicate glass recited in claim 1 wherein said chalcogenide comprises sulfur and selenium.

4. The optical waveguide of claim 2, wherein the core of said fiber comprises at least 0.05 mol percent sulfur.

5. The optical waveguide of claim 2, wherein the core of said fiber comprises at least 0.1 mol percent sulfur.

6. The optical waveguide of claim 1, wherein said waveguide comprises at least 0.05 mol percent sulfur.

7. The optical waveguide of claim 1, wherein said waveguide comprises at least 0.05 mol percent sulfur.

8. The optical waveguide of claim 1 further comprising an element selected from the group consisting of phosphorous, aluminum, and boron and mixtures thereof.

9. The optical fiber of claim 2 further comprising an element selected from the group consisting of phosphorous, aluminum, and boron and mixtures thereof.

10. The optical waveguide of claim 5 further comprising an element selected from the group consisting of phosphorous, aluminum, and boron and mixtures thereof.

11. The optical waveguide of claim 1 further comprising metal ions selected from the group consisting of germanium, titanium, zirconium, lanthanum, arsenic, and antimony.

12. The optical waveguide of claim 2 further comprising metal ions selected from the group consisting of germanium, titanium, zirconium, lanthanum, arsenic, and antimony.

13. The optical waveguide of claim 5 further comprising metal ions selected from the group consisting of germanium, titanium, zirconium, lanthanum, arsenic, and antimony.

14. The optical waveguide of claim 9 further comprising metal ions selected from the group consisting of germanium, titanium, zirconium, lanthanum, arsenic, and antimony.

15. The optical waveguide of claim 1, wherein the refractive index of said waveguide has been selectively altered along the length of said waveguide.

16. The optical waveguide of claim 15, wherein said waveguide comprises a refractive index which varies between segments of high index and low index.

17. The optical waveguide of claim 15, wherein said waveguide is fabricated into an article selected from the group consisting of amplifier fiber, transmission fiber, or laser.

* * * * *